United States Patent
Williams et al.

(10) Patent No.: US 11,451,170 B2
(45) Date of Patent: Sep. 20, 2022

(54) SYSTEM AND METHOD FOR MANAGING TRANSIENT POWER DISRUPTIONS ON ESP MOTOR DRIVES

(71) Applicant: Baker Hughes Oilfield Operations LLC, Houston, TX (US)

(72) Inventors: Gary Williams, Tulsa, OK (US); Alexey Tyshko, Oklahoma City, OK (US); Brian Reeves, Oklahoma City, OK (US); Curtis Johnson, Oklahoma City, OK (US); Nathan Etter, Tulsa, OK (US); Mohamed Ouf, Tulsa, OK (US); Mahendra Joshi, Oklahoma City, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/121,434

(22) Filed: Dec. 14, 2020

(65) Prior Publication Data

US 2021/0184603 A1    Jun. 17, 2021

Related U.S. Application Data

(60) Provisional application No. 62/947,382, filed on Dec. 12, 2019.

(51) Int. Cl.
*H02P 1/02* (2006.01)
*F04B 47/06* (2006.01)
(Continued)

(52) U.S. Cl.
CPC ............. *H02P 1/029* (2013.01); *F04B 17/03* (2013.01); *F04B 47/06* (2013.01); *F04B 49/06* (2013.01);
(Continued)

(58) Field of Classification Search
CPC  F04B 17/03; F04B 47/06; F04B 49/06; H02J 9/062; H02P 1/029; H02P 29/00
See application file for complete search history.

(56) References Cited

U.S. PATENT DOCUMENTS 6,380,708 B1 *   4/2002   Gritter ...................... H02P 1/28
                                                              318/778
9,397,513 B2 *   7/2016   Butler ..................... B60L 53/80
(Continued)

OTHER PUBLICATIONS

ISA/US; Search Report and Written Opinion for PCT/US2020/64915; dated Mar. 23, 2021.

*Primary Examiner* — Patrick Hamo
(74) *Attorney, Agent, or Firm* — Crowe & Dunlevy, P.C.

(57) ABSTRACT

A system for the resilience of an electric submersible pumping system to a transient power interruption includes a power backup connected to the variable speed drive of the pumping system. A method for controlling the electric submersible pump during the transient power interruption includes connecting a variable speed drive to a power source, charging one or more rechargeable batteries within the power backup, and connecting the power backup to the variable speed drive. The method continues with the steps of operating the motor with the variable speed drive, detecting a disruption in AC power from the power source to the variable speed drive, and applying power from the power backup to the variable speed drive to operate the motor during the transient interruption in electrical power.

15 Claims, 3 Drawing Sheets

(51) Int. Cl.
  *F04B 17/03*   (2006.01)
  *H02P 27/06*   (2006.01)
  *H02J 9/06*    (2006.01)
  *F04B 49/06*   (2006.01)
  *H02P 29/00*   (2016.01)

(52) U.S. Cl.
  CPC .............. *H02J 9/062* (2013.01); *H02P 27/06* (2013.01); *H02P 29/00* (2013.01)

(56) References Cited

U.S. PATENT DOCUMENTS

| | | | |
|---|---|---|---|
| 9,819,064 B2* | 11/2017 | Jiang | B60L 58/20 |
| 2006/0098390 A1* | 5/2006 | Ashtiani | B60K 6/28 |
| | | | 361/502 |
| 2008/0243079 A1* | 10/2008 | Wooley | A61M 5/14566 |
| | | | 604/154 |
| 2011/0052416 A1* | 3/2011 | Stiles | F04D 15/0245 |
| | | | 417/42 |
| 2011/0229345 A1 | 9/2011 | Konnur | |
| 2016/0298631 A1* | 10/2016 | Reid | F04D 13/10 |

\* cited by examiner

SYSTEM AND METHOD FOR MANAGING TRANSIENT POWER DISRUPTIONS ON ESP MOTOR DRIVES

RELATED APPLICATIONS

This application claims the benefit of U.S. Provisional Patent Application Ser. No. 62/947,382 filed Dec. 12, 2019 and entitled, "System and Method for Managing Transient Power Disruptions on ESP Motor Drives," the disclosure of which is herein fully incorporated by reference.

FIELD OF THE INVENTION

This invention relates generally to the field of pumping systems with electric motors, and more particularly, but not by way of limitation, to an improved system and method for managing transient disruptions in power to the pumping system.

BACKGROUND

Pumping systems are often deployed into wells to recover petroleum fluids from subterranean reservoirs. Typically, the submersible pumping system includes a number of components, including one or more electric motors coupled to one or more high performance pumps. Each of the components and sub-components in a submersible pumping system is engineered to withstand the inhospitable downhole environment, which includes wide ranges of temperature, pressure and corrosive well fluids.

The electric motor is often driven by a variable speed drive located on the surface. In many applications, the variable speed drive (or VSD) is connected to electrical power from an established electrical grid. In locations where connection to a power grid is unfeasible, generators may be used to drive the submersible pump through the variable speed drive. The variable speed drive produces an alternating current that is transferred to the electric motor through a power cable. In many applications, the voltage of the current provided by the variable speed drive must be increased with a step-up transformer to reach the design voltage for the electric motor.

Disruptions to electrical power can significantly impact oil and natural gas production. A power outage or blackout is defined as power interruption during which a customer loses access to the electricity grid. Power outages are measured in duration and may range from transient outages lasting less than one second to long-term outages lasting for days. Power disruptions lasting more than a few seconds typically result in situation in which the electric motor of the submersible pump must be turned off. While the power outage is occurring, the motor begins to slow and quickly loses the ability to drive the pump. When this occurs, fluid in the production tubing above the pump will fall back to the wellbore through the pump, thereby causing the pump to rotate in reverse. If the motor is energized while the pump is rotating in reverse, the motor can be damaged.

Most modern variable speed drives utilize a "power ride through" system that employs a capacitor bank to provide the line voltage (e.g. 300-480 VDC) needed for the submersible pumping system to operate during the transient power disruptions. A typical ride through system keeps the system running for about 150 ms on a full 3-phase loss. An outage longer than about 150 ms will generally shut down the variable speed drive to prevent potential damage to the electric submersible pump. Shutting down the variable speed drive and electric submersible pump will adversely affect the recovery of hydrocarbons from the wellbore. Additionally, shutting down the electric submersible pump may increase the risks of harm caused by scaling and sediment collecting in the idle electric submersible pump.

Although existing capacitor banks are widely used, they are expensive and only provide protection against very brief power disruptions. There is, therefore, a need for an improved backup system that provides robust, intelligent, and cost-effective protection against disruptions in input power to the variable speed drive. It is to these and other deficiencies in the prior art that the present invention is directed.

SUMMARY OF THE INVENTION

In one aspect, the present invention includes a pumping system that has an electric motor, a power source and a variable speed drive connected to the power source. The pumping system further comprises a power backup connected to the variable speed drive.

In another aspect, the present invention includes a method for controlling an electric submersible pump during a transient power interruption, where the electric submersible pump includes an electric motor. The method begins with the step of connecting a variable speed drive to a power source, wherein the variable speed drive has a DC bus that is charged by the power source. The method continues with the steps of charging one or more rechargeable batteries within a power backup, and connecting the power backup to the variable speed drive. The method continues with the steps of operating the motor with the variable speed drive, detecting a disruption in AC power from the power source to the variable speed drive, and applying power from the power backup to the variable speed drive to operate the motor during the transient interruption in electrical power.

In yet another aspect, the present invention includes a power backup for use in supporting the operation of an electric motor within a pumping system during a transient power interruption. The power backup includes one or more rechargeable batteries and a charging system connected to the one or more rechargeable batteries.

WRITTEN DESCRIPTION

Figure 1:
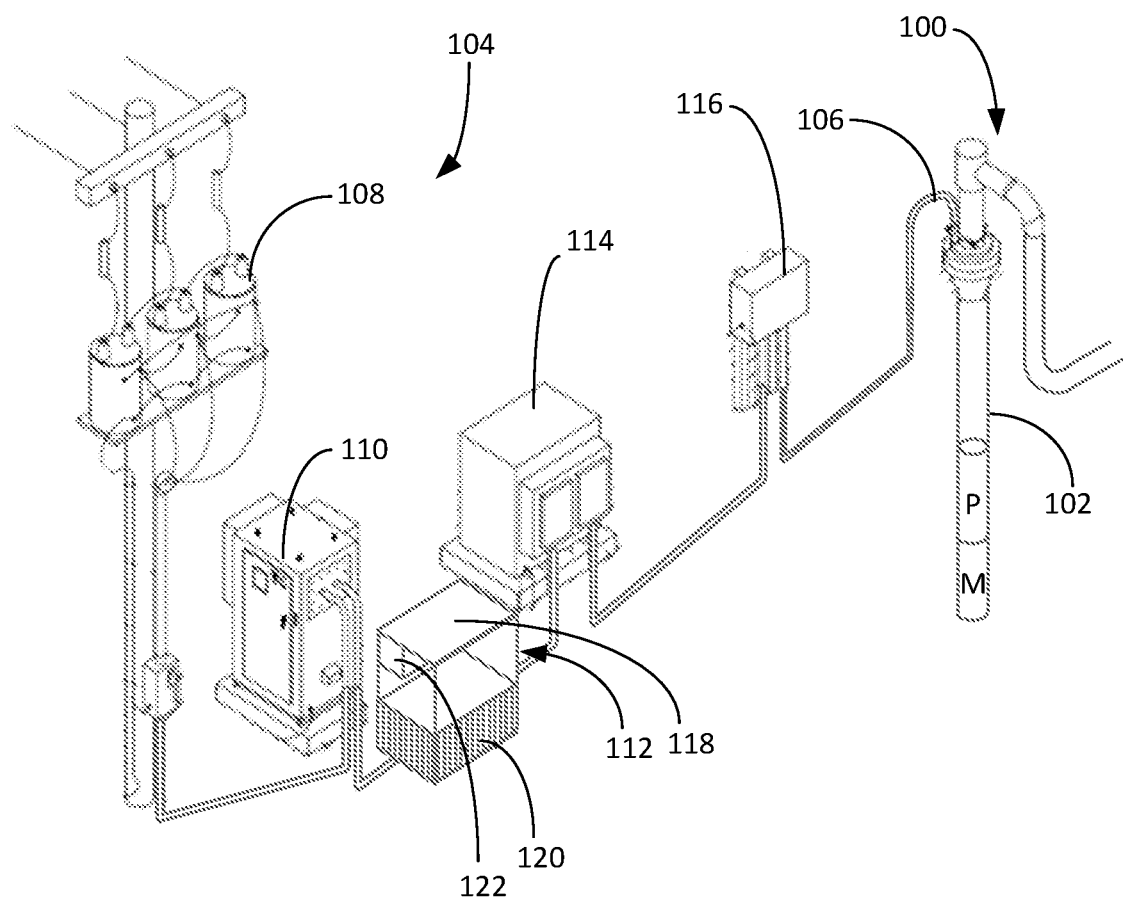
FIG. 1 depicts a pumping system installation and the surface-based electrical power and control systems.

In accordance with exemplary embodiments of the present invention, FIG. 1 depicts a pumping system 100 installed within a well 102, which is drilled for the production of a fluid such as water or petroleum. As used herein, the term "petroleum" refers broadly to all mineral hydrocarbons, such as crude oil, gas and combinations of oil and gas. Although the pumping system 100 is primarily designed to pump petroleum products, it will be understood that the present invention can also be used to move other fluids.

The pumping system 100 includes a pump (P) that is driven by an electric motor (M). The motor receives power from surface facilities 104 through a power cable 106. When energized, the motor (M) drives a shaft (not shown) that causes the pump (P) to operate. The surface facilities 104 provide power and control to the motor. The surface facilities 104 include a power source 108, a variable speed drive (VSD) 110, a power backup 112, a transformer 114 and a junction box 116. The power source 108 includes one or both of a public electric utility and an independent electrical generator. Electricity is fed by the power source 108 to the variable speed drive 110.

During normal operation, the variable speed drive 110 produces a low voltage, pulse width modulated (PWM) sinusoidal or six-step voltage at a selected frequency. The waveform, amplitude and frequency, produced by the variable speed drive 110 can be adjusted manually or automatically to adjust the operating parameters of the pumping system 100. The output of the variable speed drive 110 is provided to the transformer 114, where the voltage is modified to the design voltage range of the motor within the pumping system 100. The output from the transformer 114 is connected to the power cable 106 at the junction box 116.

In some embodiments, the power backup 112 includes a cabinet 118 (shown with exterior panels removed) that contains a plurality of rechargeable batteries 120 and a charging system 122. The rechargeable batteries 120 can be the type of rechargeable batteries currently used in electric vehicles. Suitable rechargeable batteries include lithium ion (Li-ion) rechargeable (LIR) cells. In some embodiments, the rechargeable batteries 120 include a number of individual lithium ion batteries placed in series or parallel to provide the appropriate voltage and current needed to drive the motor of the pumping system 100 during a transient power outage. Other suitable rechargeable batteries 120 may include lead-acid, NiCad, nickel-metal hydride, Li-ion polymer, zinc-air and molten-salt batteries.

The number of rechargeable batteries 120 needed within the power backup 112 can be determined by looking at the demands of the application (e.g., the power requirements of the pumping system 100 and the length of time the rechargeable batteries 120 are expected to provide power to the variable speed drive 110 during a "ride-through" sequence) and the characteristics of the rechargeable batteries 120 (e.g., voltage, amperage, discharge cut-off voltage, size and configuration, cost, and stability). As an example, the rechargeable batteries 120 may include LIR18650-2600 mAh type batteries for powering the variable speed drive 110 to temporarily drive a pumping system 100 with a motor that has a 260 KVA rating. Assuming a 480 VDC voltage output with a 542 amp current from the variable speed drive 110, the rechargeable batteries 120 would need around 208 LIR18650 cells connected in parallel. If the LIR18650 cells have a nominal voltage of 3.7 volts, the rechargeable batteries 120 should include about 100 LIR18650 cells connected in series to obtain a 370 volt output to temporarily power the variable speed drive 110.

Typical LIR batteries have discharge cut-off voltage of 3.0V. Assuming the LIR cells discharge to about 300V (e.g. the lower threshold voltage needed to power the variable speed drive 110) in about 1 second, the rechargeable batteries 120 would need about 800 LIR cells for a 260 KVA rated pumping system 100. Similar LIR battery sizing calculations can be performed for larger ESP rated at 520 KVA. The number of LIR cells in the rechargeable batteries 120 can be reduced to ¼th if the LIR cells can be configured to provide a higher current draw without overheating. These and other calculations can be used to determine the number, type and configuration of the rechargeable batteries 120. Although a plurality of smaller rechargeable batteries 120 may present a more flexible solution for the power backup 112, it will be appreciated that a single large rechargeable battery 120 is also contemplated within the scope of exemplary embodiments.

In other embodiments, the power backup 112 includes a plurality of supercapacitors. In yet other embodiments, the power backup 112 includes both rechargeable batteries 120 and supercapacitors. The charging system 122 can be configured to charge the supercapacitors or both supercapacitors and rechargeable batteries 120.

Figure 2:
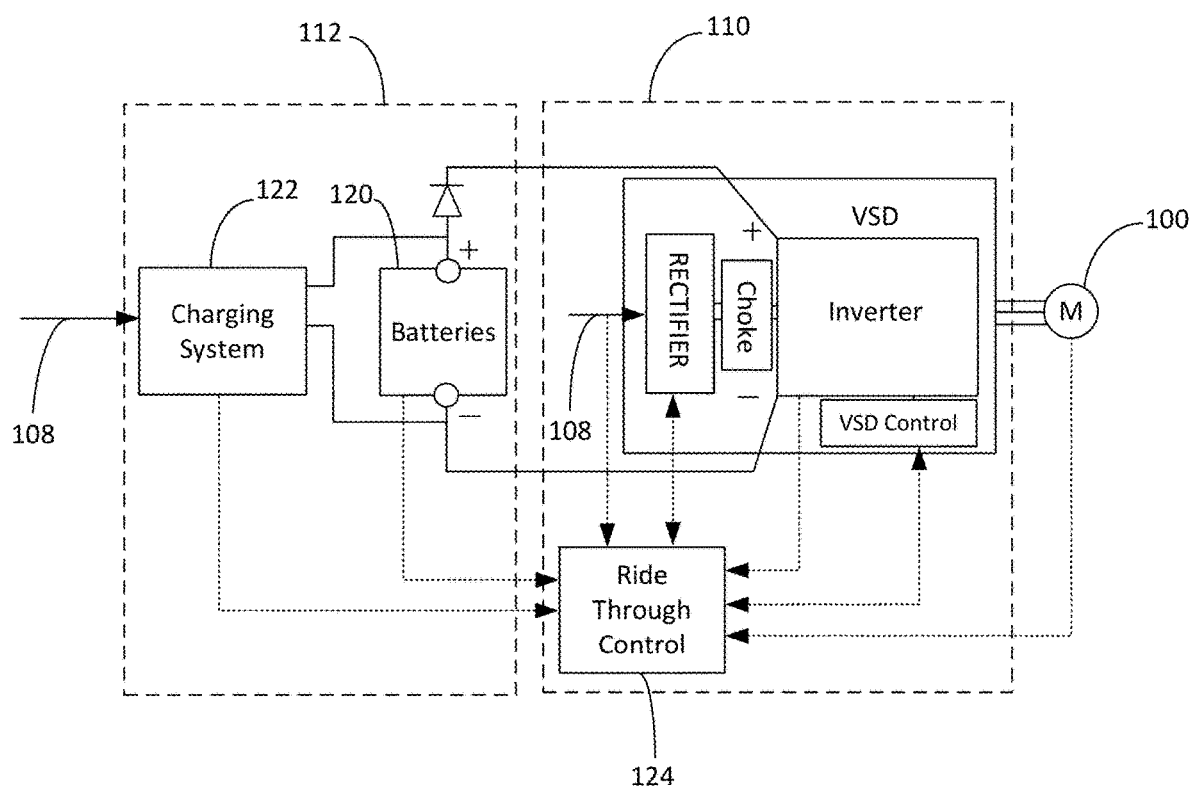
FIG. 2 is a functional depiction of the battery-supported variable speed drive.

Turning to FIG. 2, shown therein is a diagram of the functional electrical connections between the power backup 112 and the variable speed drive 110. The rechargeable batteries 120 are connected to the charging system 122, which is configured to maintain an optimal level of charge within the rechargeable batteries 120 when the charging system 122 and the rechargeable batteries 120 are connected to the power source 108. In some embodiments, the charging system 122 can be configured as a low-amperage "trickle" charger. In the embodiment depicted in FIG. 2, the rechargeable batteries 120 are placed in a parallel configuration between the power source 108 and the variable speed drive 110. Similarly, the charging system 122 can also be placed in a parallel configuration between the power source 108 and the variable speed drive 110. It will be appreciated that the variable speed drive 110 may include a number of internal and external components, including rectifiers, chokes, VSD controllers, and filter capacitors. The charging system 122 and variable speed drive 110 may be connected to the same power source 108 or different power sources 108.

A computer-implemented power backup controller 124 can be incorporated within the variable speed drive 110, the power backup 112 or in another module to control the activation and engagement of the power backup 112 with the variable speed drive 110. In some embodiments, the power backup controller 124 includes one or more signal connections between the batteries 120, the charging system 122, the mains power source 108, the motor (M) and other elements of the pumping system 100, and the variable speed drive 110. Based on inputs from sources connected to the power backup controller 124, the power backup control 124 can adjust the operation of the variable speed drive 110, as discussed below.

The use of commercially-available electric vehicle (EV) battery packs for the power backup 112 presents several advantages. Many EV battery packs have integrated robust battery management system (BMS) and inherent protection circuit or circuit interrupt device (CID) to improve the safety of the power backup 112. Additionally, many EV battery packs have external protection circuits that are commonly known as protection circuit modules (PCM) that are used to prevent thermal runaway caused by overcharge, over-discharge, over-voltage, over-current, and short-circuit conditions.

Figure 3:
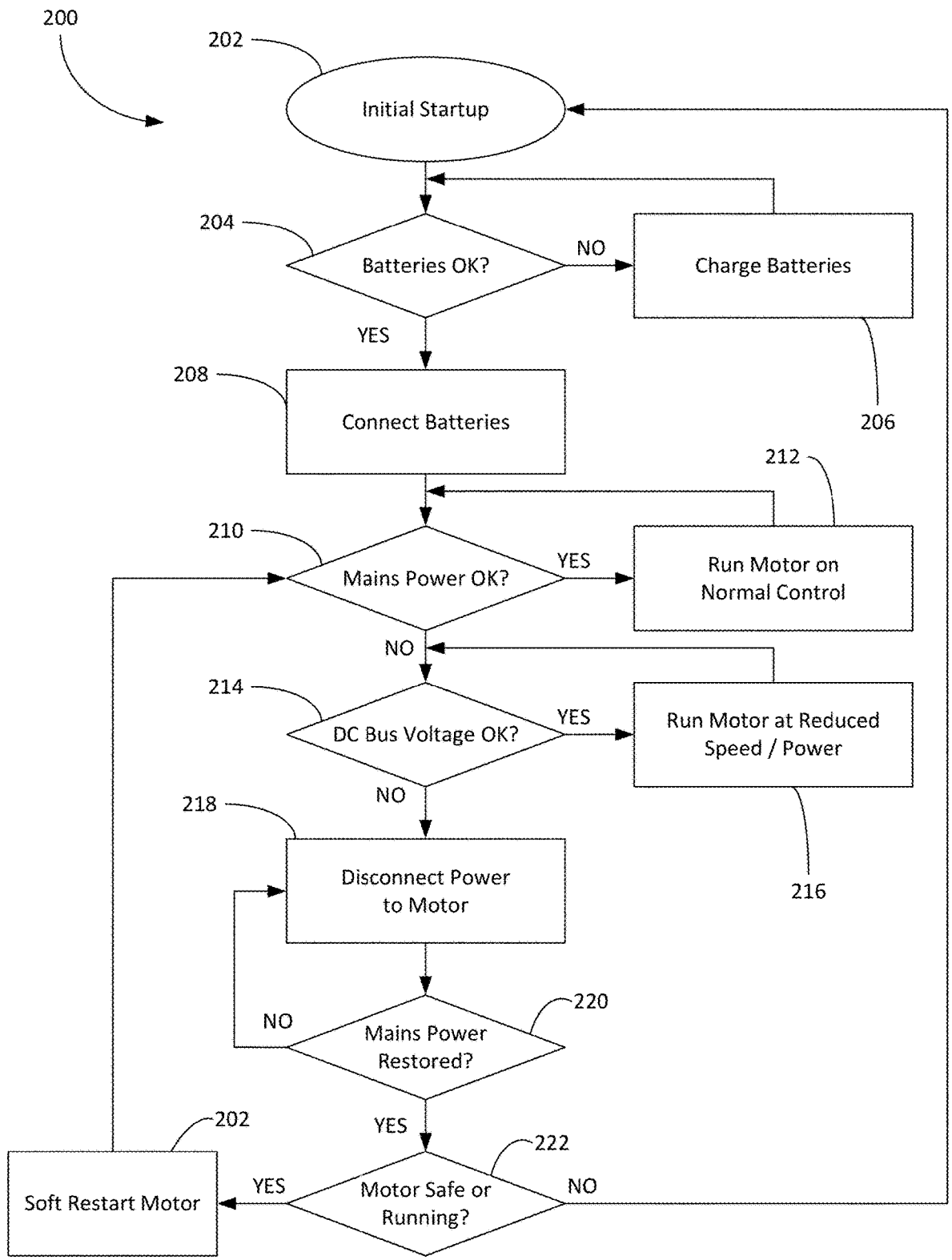
FIG. 3 is a flow diagram showing a process for providing battery-supported control of a submersible pump motor during a transient power outage.

Turning to FIG. 3, shown therein is process flow diagram for the battery-supported control process 200 of the pumping system 100 during a transient power outage, which can be executed by the power backup controller 124. The process 200 begins at block 202 when the power backup controller 124 confirms that alternating current (AC) or "mains" power is available at the variable speed drive 110 from the power source 108. The power backup control program 124 monitors the direct current (DC) voltage on the output bus of the variable speed drive 110.

At block 204, the power backup control program 124 determines if the voltage on the rechargeable batteries 120 is acceptable. If the rechargeable batteries 120 are insufficiently charged, i.e., the voltage on the rechargeable batteries 120 is below the voltage on the DC bus within the variable speed drive 110, the process 200 moves to block 206 and the rechargeable batteries are recharged using the charging system 122.

If the rechargeable batteries 120 are sufficiently charged at block 204, the process 200 moves to block 208 and the rechargeable batteries 120 are electrically connected to the variable speed drive 110. It will be appreciated that the charging system 122 can be used to maintain the charge on the rechargeable batteries 120 while the rechargeable batteries 120 are connected to the variable speed drive 110. It will be further appreciated that if the rechargeable batteries 120 are insufficiently charged or not connected to the variable speed drive 110, the process 200 can proceed but without the support from the power backup.

The process 200 continues at block 210, where the power backup controller 124 determines if the main AC (e.g., grid) power is available or if it has been interrupted. If mains power is available at the variable speed drive 110, the process moves to block 212 and the variable speed drive 110 operates the motor (M) according to a normal control profile. The process 200 repeats on a loop through blocks 212 and 210 until there is a disruption in main AC power to the variable speed drive 110.

If a disruption in AC power to the variable speed drive 110 occurs, the process 200 moves from block 210 to block 214, where the power backup controller 124 determines if the voltage at the DC bus of the variable speed drive 110 is acceptable or if the DC bus voltage in the variable speed drive 110 has dropped below a threshold lower limit (e.g., 250 volts). As used herein, a reference to a disruption or interruption in AC "mains" power to the variable speed drive 110 may refer to a complete disruption in which no power is available to the variable speed drive 110 from the power source 108, or a situation in which the voltage available at the variable speed drive 110 on one or more phases falls below the threshold lower limit. If the DC bus voltage within the variable speed drive 110 remains above the threshold lower limit, the process moves to block 216 where the variable speed drive 110 operates the motor (M) on a reduce power profile (e.g., a V/f proportional speed) to support a "ride-through" sequence in which the motor (M) is kept active for a period during the disruption or interruption in AC power to the variable speed drive 110.

In some embodiments, when a fluctuation in the voltage from the mains power 108 is detected by the variable speed drive 110 or the power backup controller 124, the variable speed drive 110 is configured to rapidly decelerate the inverter within the variable speed drive 110. Rapidly decelerating the inverter within the variable speed drive 110 will result in reduced output frequency, voltage, and consequently, the power demand from the power backup 112. For a given power backup 112, reducing the output from the variable speed drive 110 extends the limits of the battery-supported ride-through sequence. Conversely, reducing the speed of the motor (M) also permits the use of smaller, less expensive capacity power backups 112 for a given ride-through time.

In addition to rapidly reducing the rotational speed of the motor (M), the variable speed drive 110 can separately be configured to reduce the value of the Alpha firing angle until mains power is restored at the variable speed drive 110. The Alpha firing angle represents the correlation in timing between the phase-locked incoming voltage waveform and the available power from the power source 108 to the DC bus. Reducing the Alpha firing angle proactively limits potential inrush current to protect the variable speed drive 110 and input fuses when power is restored.

The process 200 loops from block 216 back to block 214 and the ride-through sequence continues until the DC bus voltage drops below the lower threshold limit as the charge on the rechargeable batteries 120 is depleted. Depending on a number of factors including the capacity of the rechargeable batteries 120 and the rate of power consumption by the variable speed drive 110 in operating the pumping system 100 at the reduced power profile, the rechargeable batteries 120 may support the required DC bus voltage for a brief or extended period.

Once the DC bus voltage drops below the lower threshold limit at decision block 214, the process 200 moves to block 218 and the power backup controller 124 disconnects power from the variable speed drive 110 to the motor (M) to prevent damage to the motor (M) or variable speed drive 110. The process 200 then moves to decision block 220, where the power backup controller 124 determines if the main AC power has been restored to the variable speed drive 110. If the mains power disruption continues, the process loops back to block 218 and the power remains disconnected between the variable speed drive 110 and the motor (M).

If the main AC power has been restored to the variable speed drive 110, the process moves to decision block 222, where the state of the motor (M) is evaluated. For very brief interruptions (e.g., less than two seconds), inertia will cause the motor (M) to continue to rotate in the driven direction and fluids will continue to be produced to the surface by the pumping system 100. Under these conditions, the power backup controller 124 determines that the motor (M) is in a safe condition and the process moves to block 202 for a smooth restart in which the variable speed drive 110 ramps the speed of the motor (M) back to a normal control profile and the process 200 returns to block 210. In this case, the power backup 112 will have provided suitable support to permit the motor (M) to "ride through" the transient disruption.

Thus, in exemplary embodiments, battery-backed power is supplied by the variable speed drive 110 to the motor before the motor slows to a speed below a critical threshold. Once the transient power disruption is resolved and power from the power source 108 has been returned to the variable speed drive 110, the variable speed drive 110 shifts back to a normal mode of operation. In some embodiments, the variable speed drive 110 controls the pumping system 100 using one or more intermediate control profiles before returning to a normal operational mode.

If, however, the power backup controller 124 determines that the motor (M) is in an unsafe condition, i.e., the motor (M) has stopped rotating in the driven direction or is spinning in a reverse direction caused by fluids falling in reverse through the pump (P), the process 200 returns to the initial startup block 202 for a hard restart. Thus, in the event the transient power disruption lasts longer than maximum period for which the power backup 112 is capable of providing power to the variable speed drive 110 to drive the pumping system 100, the pumping system 100 will be required to go through a full initial startup procedure once power has been restored from the power source 108.

As noted above, the power backup 112 is optional in the process 200. If the power backup 112 is present, the motor (M) can be slowed and continue running for an extended time during a power outage. If the power backup 112 is not present, then the DC bus within the variable speed drive 110 will collapse much faster and the process 200 executes much faster. In all cases, if the DC bus reaches a predefined critical low point then the variable speed drive 110 disconnects the motor. If the motor enters backspin or is unable to soft start for any reason, the variable speed drive 110 returns to the initial start-up state at block 202.

Thus, the novel control strategies are based on the availability of a threshold voltage at the DC bus of the variable speed drive 110. The power backup 112 and control schemes allow both a gentle (or smooth) restart by exploiting the upward moving fluid kinetic energy or fluid inertia (while maintaining the pump rotational direction) for an extremely short power outage, and also triggering a full restart mode for an extended outage if main or grid power from the power source 108 is not restored before the power backup 112 is discharged below the threshold value. The short and long-term power ride-through solutions improve motor reliability and extend the useful run life.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts and steps within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

What is claimed is:

1. A submersible pumping system configured to be deployed in a well, the submersible pumping system comprising:
   an electric motor deployed in the well;
   a pump deployed in the well, wherein the pump is driven by the electric motor;
   a power source;
   a variable speed drive connected to the power source and configured to drive the electric motor;
   a power backup connected to the variable speed drive; wherein the power backup comprises one or more batteries; and
   a power backup controller that includes a computer-implemented software program, wherein the power backup controller is configured to cause the variable speed drive to operate the electric motor of the submersible pumping system under a reduced power profile if the power backup controller determines that a disruption in the power source has occurred but a sufficient voltage remains available at the variable speed drive.

2. The pumping system of claim 1, wherein the one or more batteries are selected from the group of battery types consisting of lead-acid, nickel cadmium (NiCad), nickel-metal hydride, lithium ion (Li-ion) polymer, zinc-air and molten-salt batteries.

3. The pumping system of claim 2, wherein the one or more batteries comprise batteries designed for use in an electric vehicle.

4. The pumping system of claim 2, wherein the power backup further comprises a charging system connected to the one or more batteries.

5. The pumping system of claim 1, wherein the power backup includes a plurality of supercapacitors.

6. The pumping system of claim 1, wherein the power backup includes a combination of supercapacitors and rechargeable lithium ion batteries.

7. The pumping system of claim 4, wherein the power backup controller is connected between the charging system and the variable speed drive.

8. A method for controlling an electric submersible pump during a transient power interruption, wherein the electric submersible pump includes an electric motor, the method comprising the steps of:
   connecting a variable speed drive to a power source, wherein the variable speed drive has a DC bus that is charged by the power source;
   charging one or more rechargeable batteries within a power backup;
   connecting the power backup to the variable speed drive;
   operating the motor with the variable speed drive;
   detecting a disruption in AC power from the power source to the variable speed drive;
   applying power from the power backup to the variable speed drive to operate the motor during the transient interruption in electrical power;
   monitoring the voltage on the DC bus of the variable speed drive; and
   disconnecting power from the variable speed drive to the motor if the voltage on the DC bus falls below a threshold value.

9. The method of claim 8, further comprising the step of reducing the speed of the motor after the step of detecting a disruption in AC power from the power source to the variable speed drive.

10. The method of claim 8, further comprising the steps of:
    determining if the disruption in AC power has been resolved;
    determining if the motor is in a safe state for restart;
    initiating a soft restart of the motor if the disruption in AC power has been resolved and the motor is in a safe state for restart; and
    returning the variable speed drive to a normal mode of operation once the motor has been restarted.

11. The method of claim 8, further comprising the step of reducing the Alpha firing angle after the step of detecting a disruption in AC power from the power source to the variable speed drive.

12. A power backup for use in supporting the operation of an electric motor within a pumping system during a transient power interruption, wherein the electric motor is driven by a variable speed drive that is connected to a mains power source, the power backup comprising:
    one or more rechargeable batteries;
    a charging system connected to the one or more rechargeable batteries; and
    a power backup controller that includes a computer-implemented software program, wherein the power backup controller is configured to cause the variable speed drive to operate the electric motor of the pumping system under a reduced power profile if the power backup controller determines that a fluctuation has occurred in the mains power source.

13. The power backup of claim 12, wherein the one or more rechargeable batteries are selected from the group of battery types consisting of lead-acid, nickel cadmium (NiCad), nickel-metal hydride, lithium ion (Li-ion) polymer, zinc-air and molten-salt batteries.

14. The power backup of claim 13, wherein the one or more batteries comprise rechargeable lithium ion batteries.

15. The power backup of claim 14, wherein the one or more batteries comprise batteries designed for use in an electric vehicle.

\* \* \* \* \*